No. 843,150. PATENTED FEB. 5, 1907.
A. F. KEARNS.
HORSE HAY RAKE.
APPLICATION FILED JUNE 15, 1906.
2 SHEETS—SHEET 1.
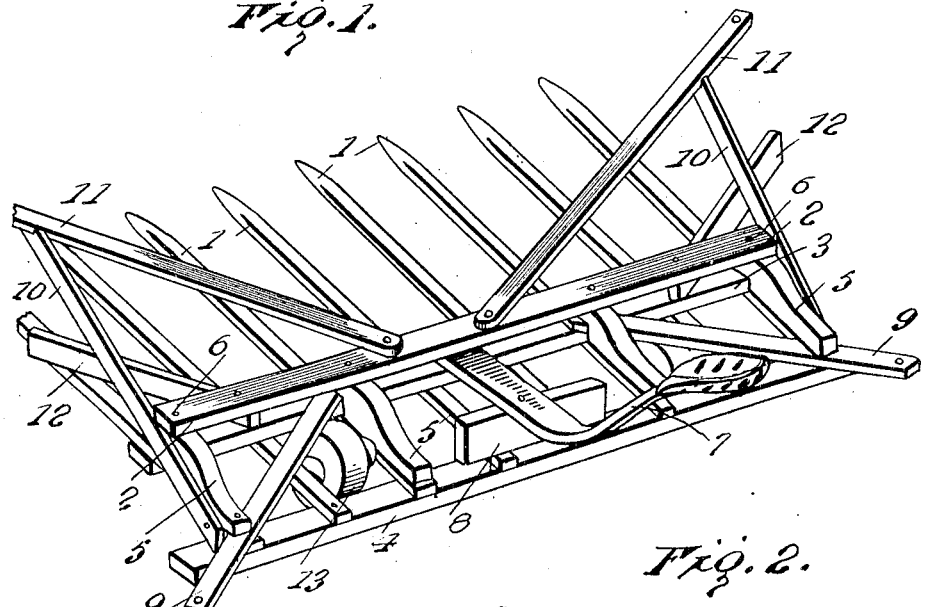
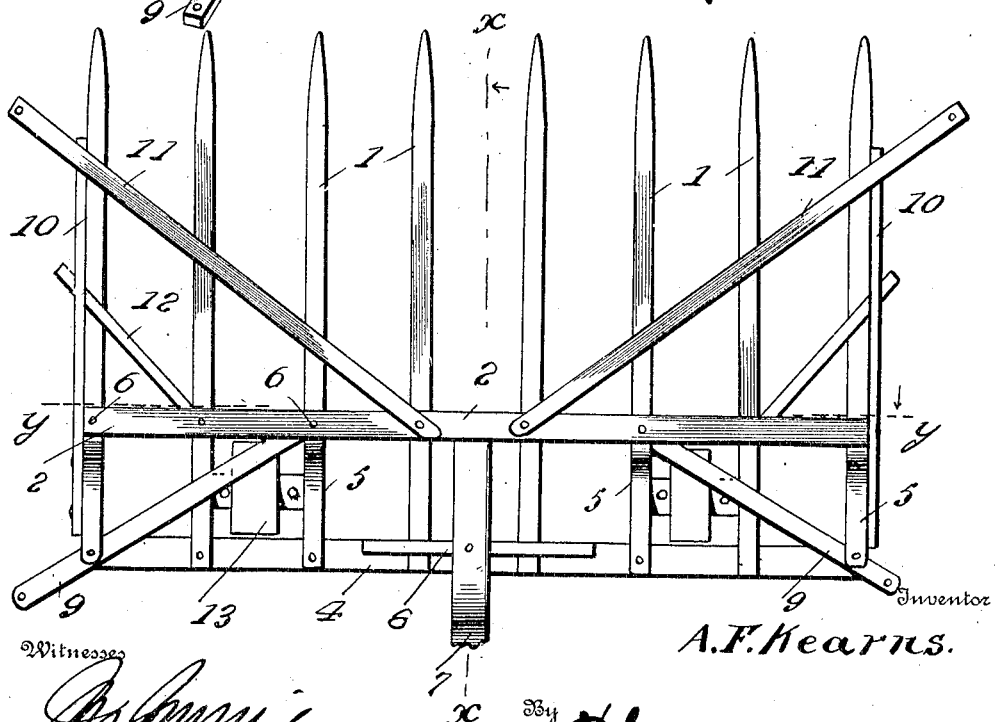

No. 843,150. PATENTED FEB. 5, 1907.
A. F. KEARNS.
HORSE HAY RAKE.
APPLICATION FILED JUNE 15, 1906.
2 SHEETS—SHEET 2.
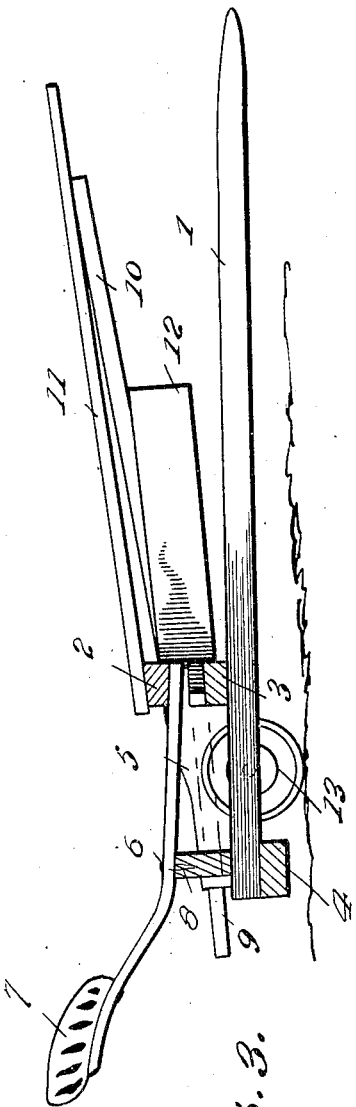
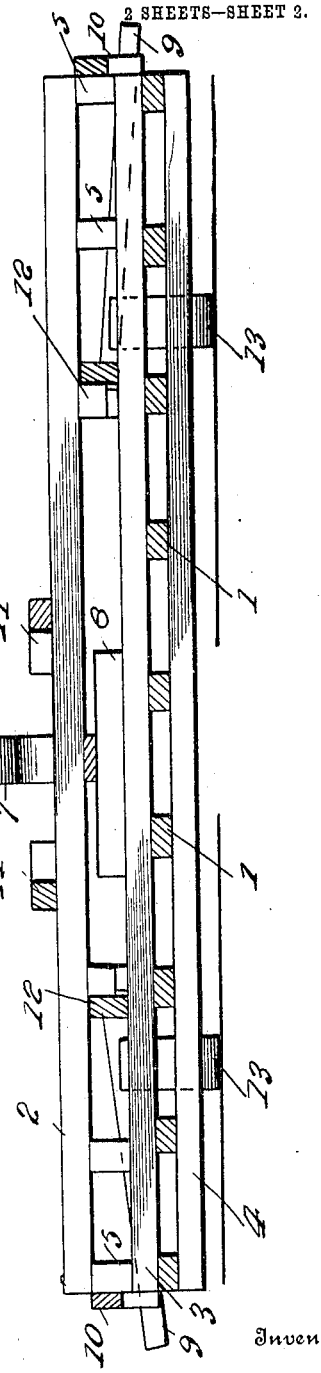
Inventor
A. F. Kearns

UNITED STATES PATENT OFFICE.

AARON F. KEARNS, OF MOSCOW, OKLAHOMA TERRITORY.

HORSE HAY-RAKE.

No. 843,150.  Specification of Letters Patent.  Patented Feb. 5, 1907.

Application filed June 15, 1906. Serial No. 321,923.

*To all whom it may concern:*

Be it known that I, AARON F. KEARNS, a citizen of the United States, residing at Moscow, in the county of Woodward and Territory of Oklahoma, have invented certain new and useful Improvements in Horse Hay-Rakes, of which the following is a specification.

The present invention appertains to the type of rakes designed more particularly for gathering hay, grain, or the like in windrows and delivering the same to a stacker, which latter deposits the same upon the pile forming the stack.

The invention provides an improved rake of the character aforesaid which is braced from every point, so as to withstand the strain, and which at the same time will enable the hay or grain to be deposited upon the carrier of the stacker without displacement at the sides thereof and which will also prevent the horses from tramping the hay at the sides of the rake and destroying the same.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a perspective view of a horse hay-rake embodying the invention. Fig. 2 is a top plan view of the rake. Fig. 3 is a longitudinal section on the line $x\ x$ of Fig. 2. Fig. 4 is a transverse section on the line $y\ y$ of Fig. 2 looking in the direction of the arrows.

Corresponding and like parts are referred to in the following description and indicated in all the views of the drawings by the same reference character.

The hay-rake comprises a series of points 1 and a head, the latter consisting of vertically-spaced bars 2 and 3. The points 1 are secured in any substantial manner to the head and project a short distance in rear thereof and are joined at their rear ends by means of a transverse bar 4. Blocks 5 are mounted upon the rear ends of certain points 1 and are secured thereto and to the rake-head and have portions coming between the bars 2 and 3 and made fast thereto by pins or bolts 6, passed through openings in the bars 2 and 3, the end portions of the blocks extending therebetween and the points upon which said blocks are mounted. The points 1 pass beneath the rake-head and extend over the transverse bar 4, thereby bringing the teeth close to the ground and enabling the head to form a stop for limiting the rearward movement of the hay or grain as gathered by the rake when drawn over the field. A seat-bar 7 extends rearward from the rake and is centrally disposed, the front end thereof being secured between the bars 2 and 3 and the rear end being supported in an elevated position by means of a block 8, mounted upon the rear portion of the rake.

Draft-bars 9 project from opposite sides of the rake and are adapted to have the horses hitched to their outer ends in any accustomed way. The draft-bars incline outwardly and rearwardly and are attached at their inner forward ends to the rake-head and near their outer ends to the rear corner portions of the rake. The inner ends of the draft-bars are let into the rear ends of the outer blocks 5, said blocks sustaining the strain and serving to distribute the same throughout the rake, whereby the life of the implement is prolonged. Longitudinal bars 10 are arranged at the sides of the rake and incline forwardly and upwardly and are secured at their rear ends to the rear portion of the rake, said bars serving as poles or tongues to receive the force when backing the rake after delivering the load upon the fork or carrier of the stacker. Braces 11 are connected at their rear ends to the rake-head and incline forwardly and outwardly and are attached near their forward ends to the longitudinal bars 10. The bridles of the horses are connected to the front ends of the braces 11, so as to prevent the horses from pulling outward in opposite directions. The braces 11 also serve in a measure to centralize the load upon the rake.

Guards 12 are located at the sides of the rake and have a forward flare, being connected at their rear ends to the rake-head and at their forward ends to the longitudinal bars 10. The guards 12 prevent lateral displacement of the hay or grain and retain the same upon the rake. The rear portion of the rake is supported upon wheels 13, which have long hubs that are adapted to come between adjacent points, so as to resist lateral stress when returning the rake preliminary to recrossing the field.

From the foregoing, in connection with the accompanying drawings, it will be understood that the rake involves an extremely simple construction and a minimum number of parts and is braced so as to resist strain and increase the period of usefulness of the implement and enable the same to be readily and conveniently manipulated.

Having thus described the invention, what is claimed as new is—

In a horse hay-rake, the combination of a rake-head, tines connected thereto and having portions extended in the rear thereof, a rearwardly-extended seat-bar, outwardly and rearwardly inclined draft-bars, longitudinal bars at the sides of the rake and having a forward and upward inclination, braces connected at their inner rear ends to the rake-head and near their forward ends to the longitudinal bars, and guards secured at their rear ends to the rake-head and forwardly flared and secured at their front ends to the longitudinal bars and to the outermost tines.

In testimony whereof I affix my signature in presence of two witnesses.

AARON F. KEARNS. [L. S.]

Witnesses:
J. H. BRITTAIN,
FRED BALLENTINE.